3,749,766
ALDEHYDE-CONTAINING ANTI-CARIES
CHEWING GUM COMPOSITIONS
John H. Litchfield, Worthington, and Victor G. Vely, Columbus, Ohio, assignors to Wm. Wrigley, Jr. Company, Chicago, Ill.
No Drawing. Filed Sept. 5, 1969, Ser. No. 855,770
Int. Cl. A61k 27/00
U.S. Cl. 424—48
14 Claims

ABSTRACT OF THE DISCLOSURE

Unique chewing gum compositions possessing anti-caries activity characteristics comprising a chewing gum base having incorporated therein at least one anti-microbial agent comprising a monoaldehyde containing at least six carbon atoms. The chewing gum compositions can and preferably do contain conventional adhesive as well as conventional flavoring agents.

---

The present invention contemplates novel and unique chewing gum compositions possessing anti-caries activity which upon chewing have the ability to inhibit the growth of oral microorganisms and the formation of acids in the oral cavity, thereby providing protection for extended periods, even after the gum composition has been chewed or masticated and discarded.

Heretofore, it has been generally known and accepted that the elaboration of acid through the breakdown of readily fermentable carbohydrates, by the action of the acidogenic oral bacteria, is a primary cause of dental caries. The method of mechanism of dental caries is generally characterized by a decalcification of the inorganic portion of the tooth and is accompanied by or followed by a disintegration of the organic matrix. The acids are formed on the tooth surface, and, if they are not neutralized or otherwise destroyed, the demineralization of the tooth will proceed.

Dentrifices and similar preparations applied to the tooth surfaces and gums have been one means heretofore customarily employed in the cleaning of teeth; and, in addition, certain proposals have been advanced relative to development of medicated dentrifices having the ability to inhibit tooth decay and for the control of dental caries. Many of such medicated dentrifices contain various inhibiting agents, such as, fluorides or amides.

Another means of control of dental caries involves the use of sodium fluoride by its addition to drinking water to provide a systemic effect, or by its topical application to tooth surfaces and has been accorded some degree of acceptance in this regard in the field. Still another means of control of dental caries involves the use of antibiotics such as penicillin and has produced some desirable results in control of dental caries; but this means is not without certain disadvantages involving sensitization of the patient, thereby limiting its value as a means of control of dental caries.

While numerous means have been heretofore proposed as potential candidates for inhibiting or neutralizing acid formation in the oral cavity as illustrated above, it appears that the problem of control of dental caries is much more complex and is not readily amenable to control by the application of conventional dentrifice preparations by the consumer once or twice a day. It appears that it is necessary for proper control of dental caries that any substance capable of inhibiting the growth of bacteria in the oral cavity should have a sufficiently prolonged effect such that after introduction into the oral cavity sufficient protection would be provided to inhibit the degradation process between periods of application, if not longer. Conventional dentrifices fail to provide such protection, and there is also the disadvantage with dentrifices that the materials are soon washed from the oral cavity, which lessens the time the active ingredients are in contact with the microorganisms.

It is apparent, therefore, that suitable means and compositions are lacking for combating the growth of oral microorganisms and acids during the periods between application of the same to the oral cavity.

It is accordingly one object of the present invention to provide an anti-caries composition in the form of a chewing gum which eliminates many of the disadvantages normally associated with the use of conventional dentrifice customarily employed for the purpose of control of dental caries.

Another object of the invention resides in the provision of chewing gum compositions having anti-caries activity which are not only effective for inhibiting the formation or growth of oral microorganisms in the oral cavity, but also effective against the formation of the acids over extended period of time. Thus the chewing gum compositions would provide protection not only while they are being masticated or chewed, but even after they have been discarded.

Yet another object of the invention resides in the provision of chewing gum compositions containing a monoaldehyde having at least six carbon atoms, said aldehyde being readily releasable upon mastication in the oral cavity or by interface contact between the gum and the teeth, so as to be capable of inhibiting 50 percent or more of the growth of the microorganisms and the formation of acids in the oral cavity for prolonged periods of time. A still further object of the invention resides in the provision of a composition containing a monoaldehyde of the group n-hexaldehyde, 2-hexene-1-al, n-heptaldehyde, octanaldehyde, nonanaldehyde, decanaldehyde, undecylic aldehyde, undecylenic aldehyde, lauric aldehyde, methylnonylacetaldehyde, which aldehydes are readily releasable upon mastication in the oral cavity or upon mastication through interfacial contact between the teeth and the gum so as to inhibit 50 percent or more of the growth of the microorganisms and the formation of acids in the oral cavity for prolonged periods of time.

These and other objects and advantages of the present invention will become further apparent from the teachings hereinafter provided by the detailed description and specific examples. In accordance with the above objects, it has been discovered that monoaldehydes of the class described (having at least 6 carbon atoms) exhibit excellent inhibition of lactic acid formation (50 percent or greater) and growth of oral streptococci and bacilli. As a result of extensive studies and experimental tests, both in vitro and in vivo of certain compounds (specifically, n-hexaldehyde, 2-hexene-1-al, n-heptaldehyde, octanaldehyde, nonanaldehyde, decanaldehyde, undecylic aldehyde, undecylenic aldehyde, lauric aldehyde, and methylnonylacetaldehyde) it has been observed that they exhibit inhibition of lactic acid formation and growth of oral streptococci and lactobacilli in the oral cavity. Additionally, it has been observed that these compounds are readily incorporated into chewing gum bases and are either released therefrom at rates sufficient to provide the activity desired for control of dental caries, or by their contact with the teeth during mastication, provide the level of cariostatic activity sufficient for control of dental caries.

In accordance with the present invention, it has been found that the incorporation of aldehydes of the class described at concentrations of about 0.1 to 5 percent concentration by weight, into chewing gum compositions. will effectively inhibit the formation of lactic acid and the growth of oral microorganisms found in the oral cavity. Specific among the aldehydes which have been tested with success include n-hexaldehyde, 2-hexene-1-al, n-heptaldehyde, octanaldehyde, nonanaldehyde, decanaldehyde, undecylic aldehyde, undecylenic aldehyde, lauric aldehyde, methylnonylacetaldehyde, which aldehydes are readily releasable upon mastication in the oral cavity or upon mastication through interfacial contact between the teeth and the gum so as to inhibit 50 percent or more of the growth of the microorganisms and the formation of acids in the oral cavity for prolonged periods of time.

The incorporation of the aforementioned aldehydes into chewing gum compositions produces an effective anti-caries composition whether the selected aldehyde is used alone or in combination with one or more members of the class of aldehydes described. Although it has not yet been determined with certainty, the effect of combinations of aldehydes, within the limits recommended above, is to reduce, to substantially the same degree, the formation of acid and growth or oral microorganisms in the oral cavity. It is expected also that combinations of aldehydes of the class described would exhibit not only an additive effect but in certain cases a synergistic effect.

In order to evaluate the aldehyde compounds of this invention for effectiveness in control of dental caries, many studies and tests were performed to confirm anti-caries activity. The data obtained as a result of these studies are summarized in tabular form as illustrated and summarized by Table I which follows:

TABLE I.—POTENTIAL CARIOSTATIC ACTIVITY OF ALDEHYDES AS DEMONSTRATED BY INHIBITION OF ACID PRODUCTION BY ORAL MICROORGANISMS IN VITRO

| Compound | | | | Activity,[a] acid-production inhibition, percent |
|---|---|---|---|---|
| Number | Formula | | Name | |
| | Empirical | Structural | | |
| 1 | $C_6H_{12}O$ | $CH_3(CH_2)_4CHO$ | n-Hexaldehyde | + |
| 2 | $C_6H_{10}O$ | $CH_3(CH_2)_2CH:CHCHO$ | 2-hexene-1-al | +++ |
| 3 | $C_7H_{14}O$ | $CH_3(CH_2)_5CHO$ | n-Heptaldehyde | ++ |
| 4 | $C_8H_{16}O$ | $CH_3(CH_2)_6CHO$ | Octanaldehyde | ++++ |
| 5 | $C_9H_{18}O$ | $CH_3(CH_2)_7CHO$ | Nonanaldehyde | ++++ |
| 6 | $C_{10}H_{20}O$ | $CH_3(CH_2)_8CHO$ | Decanaldehyde | ++++ |
| 7 | $C_{11}H_{22}O$ | $CH_3(CH_2)_9CHO$ | Undecylic aldehyde | ++++ |
| 8 | $C_{11}H_{20}O$ | $CH_3CH:CH(CH_2)_7CHO$ | Undecylenic aldehyde | ++++ |
| 9 | $C_{12}H_{24}O$ | $CH_3(CH_2)_{10}CHO$ | Lauric aldehyde | ++++ |
| 10 | $C_{12}H_{24}O$ | $CH_3(CH_2)_8CHCH_3CHO$ | Methylnonylacetaldehyde | ++ |

[a] Activity was measured by broth-tube assay to determine percent of acid-production inhibition obtained by *Lactabocillus casei* and *Streptococcus* spp. FA-1 in the presence of 0.1 percent of compound. Symbols designate the following degree of inhibition percent: —=0 to 9; +—=10 to 24; +=25 to 74; ++=75 to 89; +++=90 to 98; ++++=99 to 100.

TABLE II.—POTENTIAL CARIOSTATIC ACTIVITY OF ALDEHYDES AS DEMONSTRATED BY GROWTH INHIBITION OF ORAL MICROORGANISMS IN VITRO [a]

| Number | Compound | Oral microorganism | Bacterial population | | Inhibition percent |
|---|---|---|---|---|---|
| | | | Control | Experimental | |
| 1 | n-Hexaldehyde | Streptococcus spp. FA-1 | $5 \times 10^8$ | $4 \times 10^8$ | Insignificant. |
| | | L. casei | $1 \times 10^9$ | $1 \times 10^9$ | None. |
| 2 | 2-hexene-1-al | Streptococcus spp. FA-1 | $4 \times 10^8$ | $9 \times 10^7$ | Insignificant. |
| | | L. casei | $9 \times 10^8$ | $8 \times 10^8$ | Do. |
| 3 | n-Heptaldehyde | Streptococcus spp. FA-1 | $4 \times 10^8$ | $3 \times 10^8$ | Do. |
| | | L. casei | $1 \times 10^9$ | $1 \times 10^9$ | None. |
| 4 | Octanaldehyde | Streptococcus spp. FA-1 | $2 \times 10^8$ | $9 \times 10^3$ | >99.99. |
| | | L. casei | $8 \times 10^8$ | $2 \times 10^7$ | 97. |
| 5 | Nonanaldehyde | Streptococcus spp. FA-1 | $2 \times 10^8$ | 0 | 100. |
| | | L. casei | $8 \times 10^8$ | $4 \times 10^4$ | >99.99. |
| 6 | Decananaldehyde | Streptococcus spp. FA-1 | $2 \times 10^8$ | 0 | 100. |
| | | L. casei | $8 \times 10^8$ | $4 \times 10^2$ | >99.99. |
| 7 | Undecylic aldehyde | Streptococcus spp. FA-1 | $5 \times 10^8$ | $2 \times 10^3$ | >99.99. |
| | | L. casei | $9 \times 10^8$ | $5 \times 10^4$ | >99.99. |
| 8 | Undecylenic aldehyde | Streptococcus spp. FA-1 | $2 \times 10^8$ | 0 | 100. |
| | | L. casei | $8 \times 10^8$ | $1 \times 10^2$ | >99.99. |
| 9 | Lauric aldehyde | Streptococcus spp. FA-1 | $2 \times 10^8$ | 0 | 100. |
| | | L. casei | $8 \times 10^8$ | $<1 \times 10^2$ | >99.99. |
| 10 | Methylnonylacetaldehyde | Streptococcus spp. FA-1 | $2 \times 10^8$ | 0 | 100. |
| | | L. casei | $8 \times 10^8$ | $<1 \times 10^3$ | >99.99. |

[a] Determined on freshly grown pure cultures. Pour plates were incubated 48-72 hours.

TABLE III.—SUMMARY OF IN VIVO EVALUATIONS OF ALDEHYDES BY STANDARD METHODS OF EVALUATION [a]

| Agent | Elapsed test days | Number of animals | Strain and animal | Caries score | | Evaluated caries reduction [b] | Statistical evaluation [c] | |
|---|---|---|---|---|---|---|---|---|
| | | | | Mean incidence | Mean extent | | Caries incidence reduction | Caries extent reduction |
| Octanaldehyde | 90 | 9 | Osborne-Mendel strain 1, rat | 9.8 | 20.4 | ++ | Significant | Significant. |
| Control (RCD diet) | 90 | 7 | do | 19.0 | 49.6 | | | |
| Octanaldehyde | 90 | 10 | Osborne-Mendel strain 2, rat | 2.9 | 4.1 | +++ | do | Do. |
| Control (L2000 diet) | 90 | 9 | do | 17.4 | 31.3 | | | |
| Octanaldehyde | 59 | 7 | Albino, hamster | 18.6 | 53.8 | ++ | do | Do. |
| Control (L2000 diet) | 59 | 8 | do | 39.3 | 117.6 | | | |
| Nonanaldehyde | 90 | 7 | Osborne-Mendel strain 1, rat | 5.1 | 10.2 | +++ | do | Do. |
| Control (RCD diet) | 90 | 7 | do | 14.1 | 34.3 | | | |
| Decanaldehyde | 90 | 7 | do | 10.4 | 24.1 | ++ | do | Do. |
| Control (RCD diet) | 90 | 7 | do | 17.6 | 46.0 | | | |
| Undecylenic aldehyde | 90 | 6 | do | 7.4 | 16.4 | +++ | do | Do. |
| Control (RCD diet) | 90 | 5 | do | 22.3 | 54.6 | | | |
| Lauric aldehyde | 90 | 10 | Osborne-Mendel strain 2, rat | 10.0 | 15.6 | ++ | do | Do. |
| Control (L2000 diet) | 90 | 9 | do | 17.4 | 31.3 | | | |

[a] Agents were incorporated in the diet at a 1 percent level.
[b] Symbols designate the following approximate degree of caries reduction: ++=50 percent; +++=75 percent.
[c] Evaluated by students t test at the 95 percent confidence limit.

As can be observed in Table I, all of the aldehydes tested exhibit a degree of lactic acid-production inhibition of at least 25–74 percent, whereas certain aldehydes, such as octanaldehyde, nonanaldehyde, decanaldehyde, undecylic aldehyde, undecylenic aldehyde, and lauric aldehyde exhibited an acid-production inhibition of 99–100 percent.

As can be seen from Table II the $C_6$ and $C_7$ aldehydes, while having exhibited acid-production inhibition, did not show significant growth inhibition. However, the $C_8$–$C_{12}$ aldehydes exhibited excellent inhibitory properties not only for acid production, but against the growth of those bacteria commonly found in the oral cavity.

Table III represents in vivo tests performed with the $C_8$–$C_{12}$ aldehydes. These aldehydes all exhibited highly satisfactory reduction of the incidence and extent of oral caries in laboratory animals. The anti-caries agent was introduced as a 1 percent mixture in food over a long period of time, and the test animals then compared with controls.

As illustrated by the above test data, the aldehydes are effective in small concentrations to effect inhibition of lactic acid formation. Specific illustrative examples of aldehydes incorporated into chewing gum bases are set forth hereinafter to illustrate the concentrations which can be employed with facility to achieve and assure that significant inhibition is obtained, of at least about 50 percent, against lactic acid production. In the examples which follow it will be observed that representative aldehydes have been employed to illustrate preferred embodiments of the invention, and, as is obvious, such examples should in no way be considered as limitative thereon. Also it will be noted from the examples that the invention is not necessarily restricted to a particular chewing gum base but rather can be widely applied to chewing gum bases with which the art is well acquainted. In this sense, then, the gum base referred to hereinbefore and hereinafter refers to the non-nutritive, masticatory substance in chewing gum, as defined in the Federal Food, Drug and Cosmetic Act. In the regulation pertinent to chewing gum ingredients under the Food Additives Amendment (Federal Register, p. 4419, May 9, 1962), paragraph (a) sets forth the ingredients permitted in chewing gum base under the regulation, and paragraph (c) defines the term "chewing gum base" as meaning "the manufactured or partially manufactured non-nutritive masticatory substance comprised of one or more of the ingredients named and so defined in paragraph (a) of this section." Suitable representative chewing gum bases which can be employed with facility in formulating the chewing gum compositions of the invention are those disclosed, for example, in U.S. 2,284,804 of F. T. De Angelis and U.S. 2,137,746 of R. L. Wilson.

The flavoring agents which can be any of the usual flavoring agents well known in the art although the use of Spearmint, Doublemint or Juicy Fruit flavoring agents is generally preferred in the first example, and P.K. is utilized to designate the coated gum manufactured according to the second example. Wherever and whenever the terms "Spearmint," "Doublemint," "Juicy Fruit," and "P.K. coated gum" are used throughout this specification, they refer to products which are sold under the registered trademarks Wrigley's Spearmine chewing gum, Wrigley's Doublemint chewing gum, Wrigley's Juicy Fruit chewing gum, and Wrigley's P.K. pellet chewing gum which are proprietary marks of the Wm. Wrigley, Jr. Company of Chicago, Ill.

Where hereinafter designated the preferred embodiments also include an abhesive such as a water-soluble hydrolyzable tannin, a water-containing hydrophilic gel, and a plasticizer. A typical and representative abhesive which can be employed with the facility in the preparation of the chewing gum compositions of the invention will generally contain glycerine, gelatin and tannic acid. A variety of abhesives for chewing gum are disclosed in U.S. Pat. No. 3,255,018, patented June 7, 1966, to Arthur J. Comollo.

Abhesives are used to counteract the tendency of chewing gum compositions to adhere to teeth and particularly to certain types of dentures and artificial teeth. A hydrophilic gel, such as gelatin in the preferred embodiment, when made into a heavy paste with water forms, with a water-soluble, hydrolyzable tannin, such as tannic acid, hydrogen-bonded adducts thereby reducing the water solubility of the tannin and decreasing the rate at which it is extracted from the gum. The plasticizer, glycerine, is a cosolvent which acts with the water to form a gel of higher viscosity than is obtainable with water alone.

The abhesive, in addition to the plasticized gelatin-tannic acid adduct, may also include an amount of free tannic acid. The plasticized gel functions merely to reduce the rate of tannic acid extraction after the gum is hydrated, and accordingly, the free tannic acid may be preferred to provide initial abhesive action.

It should be noted that U.S. Pat. 3,255,018 describes a wide variety of abhesives and methods of incorporating the said abhesives in chewing gum compositions. An abhesive comprising a plasticized gelatin-tannic acid adduct together with free tannic acid is described herein merely as preferred. The chewing gum compositions of this invention may include any desired abhesive, and the uses of the gelatin-tannic acid adduct and tannic acid is not intended to limit the scope of this invention in any way. Accordingly, the abhesives of U.S. Pat. No. 3,255,018 together with the methods of formulating the said abhesives and including them in chewing gum compositions disclosed therein are hereby incorporated in their entirety.

The following examples illustrate the incorporation of the anti-caries agents of this invention in each of three basic chewing gum formulations. The first example is a general formula and method of making a stick gum with an anti-caries agent. The second example relates to coated gum, and the third relates to bubble gum. It should be noted that the chewing gum formulations are illustrative only, and may be varied, as would be obvious to one skilled in the art, without departing from the concept of this invention which specifically includes the incorporation of an anti-caries agent in a chewing gum composition.

Broadly speaking the anti-caries agent is added in the same manner as the abhesive and flavoring and may be mixed with these agents prior to their incorporation in the gum or added separately as is illustrated in the following examples:

EXAMPLE I

| Ingredients | Parts by weight | | |
| --- | --- | --- | --- |
| | (A) | (B) | (C) |
| Gum base | 20.4 | 20.0 | 20.0 |
| Corn syrup | 20.6 | 20.0 | 20.0 |
| Sugar | 55.7 | 53.2 | 51.2 |
| Corn Sugar | 1.6 | 1.6 | 1.6 |
| Gelatin-tannic acid adduct | 2.6 | 2.6 | 2.6 |
| Tannic acid | 0.1 | 0.1 | 0.1 |
| Glycerine | 1.6 | 1.6 | 1.6 |
| Flavor | 0.6 | 0.6 | 0.6 |
| Anti-caries agent | 0.1 | 3.0 | 5.0 |

The gum base is softened by working in a warm mixer maintained at a temperature of 122° F. The gelatin-tannic acid adduct is then added and thoroughly mixed with the softened base. All of the corn syrup is then added along with the anti-caries agent followed by two-thirds of the mixture of sugar and corn sugar. When these ingredients are well mixed, the glycerine is added followed by the balance of the sugar-corn sugar mixture. Subsequently the tannic acid is added followed by the flavor which may be Spearmint, Doublemint, or Juicy Fruit. As soon as the last ingredients are thoroughly mixed, the batch is discharged, allowed to cool slightly, sheeted and scored in the usual fashion.

Columns (A), (B) and (C) represent the parts by weight of stick chewing gum formulations when the anti-caries agent is 0.1, 3.0, and 5.0 parts by weight of the mixture. The anti-caries agents used were either n-hexaldehyde, 2-hexene-1-al, n-heptaldehyde, octanaldehyde, nonanaldehyde, decanaldehyde, undecylic aldehyde, undecylenic aldehyde, lauric aldehyde, and methylnonylacetaldehyde. These compounds may be used alone or in a combination of two or more in total parts by weight of from 0.1 to 5.0 as desired.

EXAMPLE II

The following example is a generalized formula for a coated gum formulation, such as Wrigley's P.K. pellet chewing gum. The anti-caries agents are those listed in Example I, n-hexaldehyde, 2-hexene-1-al, n-heptaldehyde, octanaldehyde, nonanaldehyde, decanaldehyde, undecylic aldehyde, undecylenic aldehyde, lauric aldehyde, and methylnonylacetaldehyde. The anti-caries agent may be added as an ingredient to either the center or the coating or interspersed throughout both in a weight percent of from 0.1 to 5.0 as desired. As in Example I the agent may be a single aldehyde or a combination of two or more totaling from 0.1 to 5.0 weight percent of the total coated gum composition.

| Center: | Percent by weight |
|---|---|
| Glycerine | 0.76 |
| Sugar | 50.43 |
| Corn syrup | 20.93 |
| Corn sugar | 1.90 |
| Flavor | 0.76 |
| Gum base | 25.22 |
| Coating: | |
| Carnauba wax | 0.01 |
| Sugar | 92.49 |
| Gum arabic | 5.52 |
| Dextrine | 1.38 |
| Flavor | 0.60 |

The centers are mixed as described in Example I and may include an abhesive agent as therein described, if desired. If the anti-caries agent is to be added in whole or in part to the center the procedure of Example I is followed.

After the centers are sheeted and cooled they are broken into individual pieces. A weighed quantity is added to each coating pan. A sugar syrup and a gum arabic-solution are prepared for the coating operation. The rotation of the coating pan begins and a dipper of the syrup-gum arabic mixture is added to the centers. Warm air is used to dry the mixture on the centers. Flavor is added at appropriate intervals during the coating operation. If the anti-caries agent is to be added to the coating it is added with the flavor. The gum arabic is eliminated from the coating mixture and only syrup is used during the second coat. Forty coats in all are applied. The finished pieces are polished with Carnauba wax.

EXAMPLE III

The following example pertains to the formulation of a bubble gum composition including an anti-caries agent. The anti-caries agent is selected from the list of Example I, n-hexaldehyde, 2-hexene-1-al, n-heptaldehyde, octanaldehyde, nonanaldehyde, decanaldehyde, undecylic aldehyde, undecylenic aldehyde, lauric aldehyde, and methylnonylacetaldehyde. They may be incorporated into the chewing gum composition of this example in weight percent of from 0.1 to 5.0 as desired. The aldehydes may be used alone or in a combination of two or more totalling 0.1 to 5.0 parts by weight of the gum composition.

| Ingredients: | Percent by weight |
|---|---|
| Gum base | 16.8 |
| Corn syrup | 22.4 |
| Sugar | 59.7 |
| Water | 0.3 |
| Glycerine | 0.3 |
| Flavor | 0.5 |

The gum base is softened by working in a warm mixer maintained at temperature of 122° F. All of the corn syrup is then added along with the anti-caries agent followed by two-thirds of the mixture of sugar and corn sugar. When these ingredients are well mixed, water and glycerine are added followed by the balance of the sugar mixture. Finally, the flavor is incorporated. As soon as all the ingredients have been thoroughly mixed, the batch is discharged, allowed to cool slightly, and formed into individual pieces of desired shapes and sizes, and scored in the usual fashion.

It is believed manifest and apparent from the teachings set forth hereinbefore and the specific examples provided that many different components and materials may be utilized in the manufacture of compositions in accordance with the spirit of the invention. Also, new materials including synthetic resins and polymeric materials are constantly being developed and made commercially available, many of which, undoubtedly, will be found useful in the manufacture of the compositions of the invention. It is, therefore, not only impossible to attempt a comprehensive catalog of useful components at this time and, further, to attempt to comprehend and describe the invention in its broader aspects in terms of the physical and chemical nomenclature of the components used herein might tend to be misleading. It is believed that the invention lies, at least in part, in the physical relation or mechanical correlation of suitable components and their individual composition is important only in the manner that individual properties of elements of any mechanical assemblage are important to their proper combination and coaction. Therefore, to formulate a set of specifications for compositions of the invention in the light of the present disclosure obviously will call for chemical knowledge and skill without departing from the spirit of the invention. It is believed the office of the chemist, chemical engineer and the like will be similar to that of the mechanical engineer who prescribes, in the construction of a machine, the proper materials and the proper dimensions therefor. From his knowledge as a chemist of the materials available he will know or deduce, with confidence, their applicability to the achievement of the objects and purposes of the invention or, otherwise, and in the case of novel materials routine tests not necessarily of an inventive nature will provide reliable data for such determination. In analogy to the case of a machine wherein the use of certain materials of construction or dimensions of parts would lead to no practically useful result, various materials will be rejected as inapplicable while others operative as such and illustrative of the theoretical basis of the invention may not be practically useful because the significant temperatures or ranges of temperatures involved would not be particularly advantageous or find a particular application in the practical art or because of consideration of the cost of the materials, etc. Thus, it is believed that it can be safely assumed that no one skilled in the art would wish to make a useless composition or would be misled because it is possible to misapply the teachings of the present disclosure in order to do so.

What is claimed and desired to be secured by United States Letters Patent is:

1. A chewing gum composition comprising a chewing gum base and an effective amount of up to about 5% by weight of n-hexaldehyde to give the gum anti-caries activity, said aldehyde being capable of producing at least 50% acid production inhibition of the microorganisms *Lacto-*

*bacillus casei*, and Streptococcus sp. FA-1 as measured by broth tube assay.

2. The chewing gum composition of claim 1 wherein said aldehyde is present in from about 0.1% to about 3% by weight of the chewing gum composition.

3. A chewing gum composition comprising a chewing gum base and an effective amount of up to about 5% by weight of 2-hexene-1-al to give the gum anti-caries activity, said aldehyde being capable of producing at least 50% said production inhibition of the microorganisms *Lactobacillus casei*, and Streptococcus sp. FA-1 when measured by broth tube assay.

4. The chewing gum composition of claim 3 wherein said aldehyde is present in from about 0.1% to about 3% by weight of the chewing gum composition.

5. A chewing gum composition comprising a chewing gum base and an effective amount of up to about 5% by weight of n-heptaldehyde to give the gum anti-caries activity, said aldehyde being capable of producing at least 50% acid production inhibition of the microorganisms *Lactobacillus casei*, and Streptococcus sp. FA-1 when measured by broth tube assay.

6. The chewing gum composition of claim 5 wherein said aldehyde is present in from about 0.1% to about 3% by weight of the chewing gum composition.

7. A chewing gum composition comprising a chewing gum base and an effective amount of up to about 5% by weight of nonanaldehyde to give the gum anti-caries activity, said aldehyde being capable of producing at least 50% acid production inhibition of the microorganisms *Lactobacillus casei*, and Streptococcus sp. FA-1 when measured by broth tube assay.

8. The chewing gum composition of claim 7 wherein said aldehyde is present in from about 0.1% to about 3% by weight of the chewing gum composition.

9. A chewing gum composition comprising a chewing gum base and an effective amount of up to about 5% by weight of undecylic aldehyde to give the gum anti-caries activity, said aldehyde being capable of producing at least 50% acid production inhibition of the microorganisms *Lactobacillus casei*, and Streptococcus sp. FA-1 when measured by broth tube assay.

10. The chewing gum composition of claim 9 wherein said aldehyde is present in from about 0.1% to about 3% by weight of the chewing gum composition.

11. A chewing gum composition comprising a chewing gum base and an effective amount of up to about 5% by weight of lauric aldehyde to give the gum anti-caries activity said aldehyde being capable of producing at least 50% acid production inhibition of the microorganisms *Lactobacillus casei*, and Streptococcus sp. FA-1 when measured by broth tube assay.

12. The chewing gum composition of claim 11 wherein said aldehyde is present in from about 0.1% to about 3% by weight of the chewing gum composition.

13. A chewing gum composition comprising a chewing gum base and an effective amount of up to about 5% by weight of methylnonylacetaldehyde to give the gum anti-caries activity, said aldehyde being capable of producing at least 50% acid production inhibition of the microorganisms *Lactobacillus casei*, and Streptococcus sp. FA-1 when measured by broth tube assay.

14. The chewing gum composition of claim 13 wherein said aldehyde is present in from about 0.1% to about 3% by weight of the chewing gum composition.

References Cited

UNITED STATES PATENTS 3,497,590    2/1970    Eigen _____ 424—48

OTHER REFERENCES

Chemical Abstracts, vol. 51, entry 14008b, 1957.

Maruzzella et al., Soap, Perfumery and Cosmetics, vol. 34, pages 743–746, 1961.

RICHARD L. HUFF, Primary Examiner

U.S. Cl. X.R.

424—333

PO-1050
(5/69)

UNITED STATES PATENT OFFICE
CERTIFICATE OF CORRECTION

Patent No. 3,749,766          Dated July 31, 1973

Inventor(s) John H. Litchfield and Victor G. Vely

It is certified that error appears in the above-identified patent and that said Letters Patent are hereby corrected as shown below:

In line 6 of the Abstract, "adhesive" should read --abhesive--.
        Column 1, line 32, "the acidogenic" should read --acidogenic-
        Columns 3 and 4, Table I, last line,
           "Methylnonylacetaldehyde ............. ++" should read --Methylnonylacetaldehyde .............+++ --; in the footnote, line 1, "Lactabocillus" should read --Lactobacillus--; in the footnote, line 2, "spp." should read --sp,--.
                  Table II, line 10, "6 .... Decananaldehyde" should read --6 .......... Decanaldehyde.--.
       Column 5, line 62, "Spearmine" should read --Spearmint--.
       Column 8, line 63, "art" should read --arts--.
       Column 9, line 1, Claim 1, "as" should read --when--.
          line 10, Claim 3, "said" should read --acid--.

Signed and sealed this 19th day of February 1974.

(SEAL)
Attest:

EDWARD M. FLETCHER, JR.
Attesting Officer

C. MARSHALL DANN
Commissioner of Patents